United States Patent
Agarwal et al.

(10) Patent No.: US 12,293,110 B2
(45) Date of Patent: May 6, 2025

(54) STORAGE DEVICE POOL MANAGEMENT BASED ON STORAGE DEVICE QUEUE USAGE

(71) Applicant: Western Digital Technologies, Inc., San Jose, CA (US)

(72) Inventors: Dinesh Kumar Agarwal, Bangalore (IN); Amit Sharma, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,311

(22) Filed: Aug. 2, 2023

(65) Prior Publication Data

US 2024/0338148 A1 Oct. 10, 2024

Related U.S. Application Data

(60) Provisional application No. 63/458,361, filed on Apr. 10, 2023.

(51) Int. Cl.
*G06F 3/06* (2006.01)
(52) U.S. Cl.
CPC .......... *G06F 3/0659* (2013.01); *G06F 3/0613* (2013.01); *G06F 3/0688* (2013.01)

(58) Field of Classification Search
CPC ..... G06F 3/0659; G06F 3/0613; G06F 3/0688
See application file for complete search history.

(56) References Cited

U.S. PATENT DOCUMENTS

| | | | |
|---|---|---|---|
| 8,996,450 B1* | 3/2015 | Rubio | G06F 3/0631 707/602 |
| 9,400,615 B2 | 7/2016 | McKean et al. | |
| 9,423,967 B2 | 8/2016 | Colgrove et al. | |
| 9,983,801 B1* | 5/2018 | Karnowski | H04L 67/1097 |
| 10,156,994 B2* | 12/2018 | Ayyavu | G06F 3/0635 |
| 2019/0324658 A1 | 10/2019 | Walsh | |

* cited by examiner

*Primary Examiner* — Eric Cardwell

(74) *Attorney, Agent, or Firm* — LOZA & LOZA, LLP; Gabriel Fitch

(57) ABSTRACT

Aspects of the disclosure relate to improved techniques for managing a data storage device (DSD) pool, and in particular the selecting of DSDs based on commands distribution and latencies among the command queues in the DSDs. In some aspects, a DSD may have multiple queues that enable the DSD to perform certain commands (e.g., write commands and/or read commands) in parallel. Thus, such DSD has various head-of-line blocking latencies based on which queue the command is directed to. A storage management device can reduce the command latency of the DSDs, for example, based on queue information (e.g., head-of-line blocking, parallel queue utilization, etc.) learned from the DSDs.

20 Claims, 10 Drawing Sheets

STORAGE DEVICE POOL MANAGEMENT BASED ON STORAGE DEVICE QUEUE USAGE

CROSS REFERENCE TO RELATED APPLICATIONS

This application claims priority to and the benefit of U.S. Provisional Application No. 63/458,361, entitled "STORAGE DEVICE POOL MANAGEMENT BASED ON STORAGE DEVICE QUEUE USAGE," filed Apr. 10, 2023, the entire content of which is incorporated herein by reference as if fully set forth below in its entirety and for all applicable purposes.

FIELD

The subject matter described herein relates to management of pools of data storage devices (DSDs). More particularly, the subject matter relates, in some examples, to management of pools of DSDs based on DSD queue usage.

INTRODUCTION

Data storage devices (DSDs), such as solid-state devices (SSDs), can be pooled into a storage pool. This type of storage virtualization is used in various information technology (IT) infrastructures. In principle, a storage pool can include multiple DSDs pooled together to form a virtual storage pool (VSP), eliminating the need for the host to communicate with each DSD individually and collectively providing a larger overall capacity to the host. VSPs offer many advantages such as effective utilization of various storage media and ease of access to storage media. At the same time, the various DSDs (e.g., SSDs) in a VSP may have different firmware and/or hardware architectures.

A VSP can be implemented to include DSDs that have different architectures and command execution latencies based on the architecture. During operation, a VSP can receive read and/or write commands (with data) from a host, and a storage management device can direct the commands to the DSDs. The DSDs can store the received commands in one or more queues. Different DSDs can use different command queue management techniques that result in different guaranteed command execution latencies. For example, these latencies can be based on the type and number of queues provided in the DSDs. Generally speaking, each DSD needs to process the commands already in the queue before the DSD can service a later arriving command from the queue. This issue is known as the head-of-line blocking. Therefore, depending on the number of commands waiting in the queues, the VSP may have different latencies during operation. Accordingly, improved techniques for making VSPs with more consistent latency and less head-of-line blocking are desirable.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage system that includes a storage pool (SP) including a plurality of data storage devices, each including a non-volatile memory (NVM). The plurality of data storage devices include at least one first data storage device each including a single command queue, and at least one second data storage device each including a plurality of command queues. The data storage system further includes a storage management device configured to receive, from each of the plurality of data storage devices in the SP, queue information of each respective queue of the plurality of data storage devices. The storage management device is further configured to receive, from a host, a command to be performed using the SP. The storage management device is further configured to select, based on the queue information, a target data storage device among the plurality of data storage devices to minimize head-of-line blocking for the received command and to maximize parallel usage of each of the command queues in the at least one first data storage device and the at least one second data storage device. The storage management device is further configured to send the received command to the target data storage device.

Another aspect of the disclosure provides a method for use with a data storage system including a storage pool (SP), the SP including a plurality of data storage devices, each including a non-volatile memory (NVM). The plurality of data storage devices include at least one first data storage device each including a single command queue and at least one second data storage device each including a plurality of command queues. The method includes receiving, from each of the plurality of data storage devices in the SP, queue information of each respective queue of the plurality of data storage devices. The method further includes receiving, from a host, a command to be performed using the SP. The method further includes selecting, based on the queue information, a target data storage device among the plurality of data storage devices to minimize head-of-line blocking for the received command and to maximize parallel usage of each of the command queues in the at least one first data storage device and the at least one second data storage device. The method further includes sending the received command to the target data storage device.

Another aspect of the disclosure provides a data storage system including a storage pool (SP) comprising a plurality of data storage devices, each including a non-volatile memory (NVM). The data storage system further includes means for receiving, from each of the plurality of data storage devices in the SP, queue information of each respective queue of the plurality of data storage devices. The data storage system further includes means for receiving, from a host, a command to be performed using the SP. The data storage system further includes means for selecting, based on the queue information, a target data storage device among the plurality of data storage devices to minimize head-of-line blocking for the received command and to maximize parallel usage of command queues in at least one first data storage device and at least one second data storage device among the plurality of data storage devices. The at least one first data storage device each includes a single command queue and the at least one second data storage device each includes a plurality of command queues. The data storage system further includes means for sending the received command to the target data storage device.

DETAILED DESCRIPTION

Figure 1:
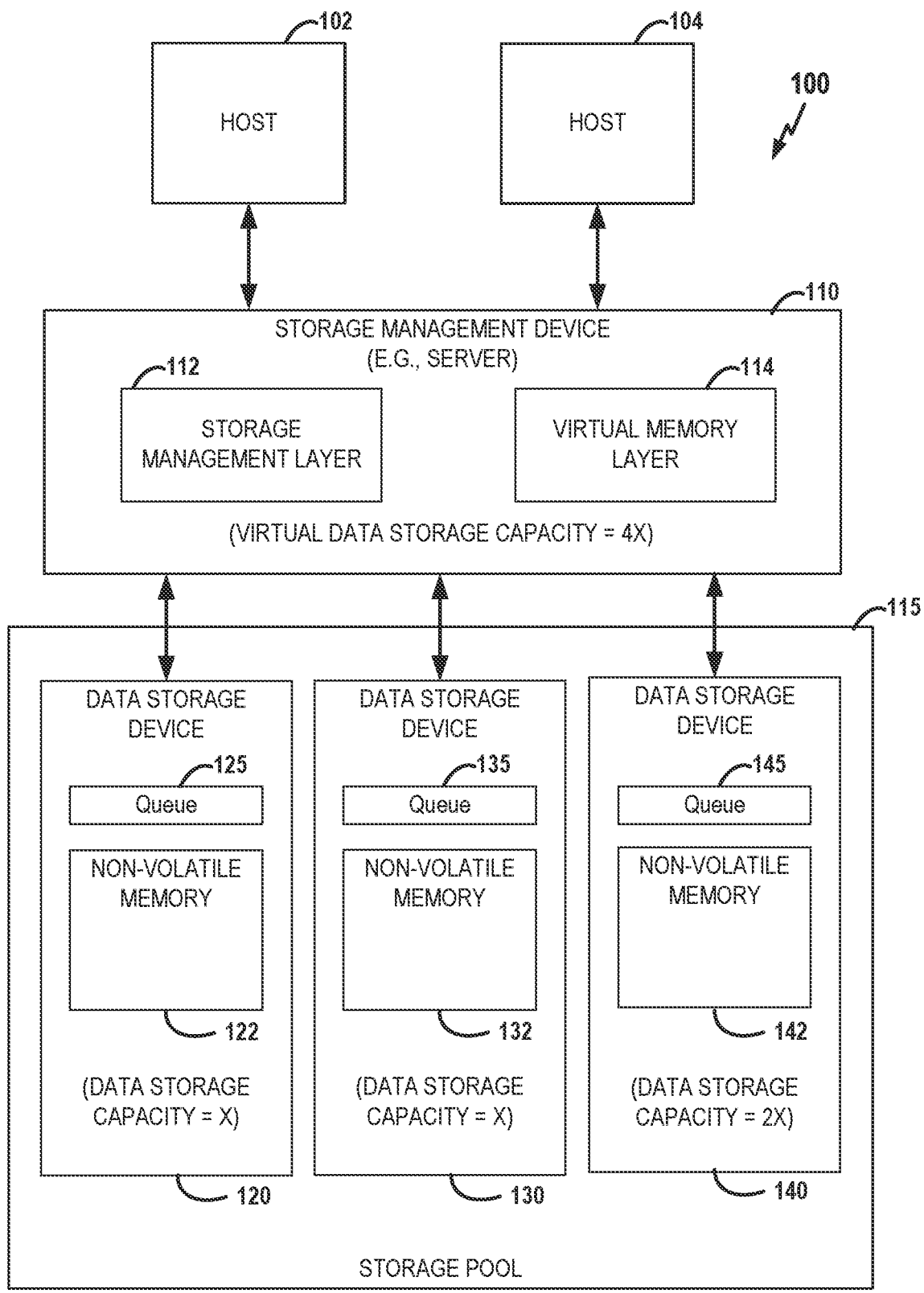
FIG. 1 is a schematic block diagram illustrating an exemplary data storage system including a virtual storage pool (VSP) in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to storage management devices coupled to DSDs. In the main examples described herein, data is stored within non-volatile memory (NVM) arrays. DSDs with NVM arrays may be referred to as solid state devices (SSDs). DSDs also can include hard disk drives (HDDs), tape drives, hybrid drives, etc. Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a data storage device (DSD) below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the disclosure relate to improved techniques for managing a data storage device (DSD) pool, and in particular the selecting of DSDs based on command distribution and latencies among the command queues in the DSDs. A storage management device sends commands to the DSDs in order to store or retrieve data from the DSDs. Some examples of the commands are read requests, write requests, trim requests, erase requests, and so forth. The storage management device can reduce the command latency of the DSDs, for example, based on queue information (e.g., head-of-line blocking, parallel queue utilization, etc.) learned from the DSDs. The latency of a queue is determined by the number of commands already in the queue, which need to be served before a new command. In some aspects, a DSD (e.g., SSD) may have multiple queues that enable the DSD to perform certain commands (e.g., write commands and/or read commands) in parallel. Thus, such DSD may have various head-of-line blocking latencies based on which queue the command is directed to.

In some aspects, when the storage management device issues a write command or a read command to the DSD pool, the storage management device can give preference to a certain target DSD, which would have the least head-of-line blocking for a queue available to serve the command. In some aspects, the storage management device ensures that overall queue usage and/or parallel queue usage is optimal across the queues of the DSDs to minimize the head-of-line blocking in the queues. A DSD may have various queue architectures, for example, a common shared queue, a queue per channel, a queue per plane, or a queue per die; or a combination thereof.

In a particular aspect disclosed herein, a virtual storage pool (VSP) includes a storage management device (e.g., a server or host) connected to DSDs of a storage pool, where the storage management device is configured to manage the latencies of the DSDs, as well as reducing head-of-line blocking at the command queues of the DSDs. In some examples, the DSDs may be SSDs. For instance, it is contemplated that the storage management device dynamically considers the command distribution among the queues to avoid or reduce head-of-line blocking in the queues. In some aspects, the storage management device can select the DSD with the fewest queued commands (e.g., less queue depth than the queue depth of other DSDs) to serve a new command, for example, based on feedback from the DSDs. In some aspects, the storage management device can distribute the commands among the DSDs to ensure that some dedicated queues (e.g., a high priority queue) are utilized frequently in some DSDs and some queues are less frequently utilized, thus resulting in improved latencies for all commands. The improved queue management techniques enable a VSP to use lower-cost devices with fewer queues.

Exemplary Devices, Systems, and Procedures

FIG. 1 is a schematic block diagram illustrating an exemplary data storage system 100 including a VSP in accordance with some aspects of the disclosure. The data storage system 100 includes a storage management device 110 coupled to three DSDs 120, 130, and 140 along with two hosts 102, 104 (host devices). The storage management device (SMD) 110 can include, or be embodied as, a server, or other such device. The storage management device 110 may include a storage management layer 112 configured to manage a storage pool 115 that includes a plurality of DSDs (e.g., DSDs 120, 130, and 140). The storage management device 110 and the storage pool 115 collectively form the VSP. In one aspects, the storage management device 110 may also include a virtual memory layer 114 configured to provide the hosts 102 and 104 with an abstraction of the DSDs 120, 130, and 140 embodied as a VSP, where the capacity of the VSP (i.e., "4X") is the sum of the respective capacities of DSDs 120, 130, and 140 (i.e., "X", "X", and "2X"). Here, it should be appreciated that although FIG. 1 shows specific exemplary capacities for DSDs 120, 130, and 140, other suitable/relative capacities can be used in other embodiments. In one aspect, the VSP could include only two DSDs or more than three DSDs. In some examples, the DSDs may be SSDs.

As illustrated, the storage management device 110 is coupled to two hosts (e.g., hosts 102 and 104). The hosts 102 and 104 provide commands and data to the storage management device 110 for storage in the storage pool 115 that includes a plurality of DSDs (e.g., DSDs 120, 130, and 140). For example, the hosts 102 and 104 may send write commands (with data) to the storage management device 110 for storing data to the VSP, or read commands to the storage management device 110 for retrieving stored data from the VSP. Each of the DSDs may include one or more queues (e.g., queues 125, 135, and 145) for storing the commands before the commands can be performed by the DSD. In some aspects, the DSDs 120, 130, and 140, may have different queue configurations (e.g., different in types and/or quantity). The storage management device 110 can communicate with the queues using any suitable communication interface, such as a Non-Volatile Memory express (NVMe) interface.

The hosts 102 and 104 may be any system or device having a need for data storage or retrieval and a compatible interface for communicating with the VSP. For example, the hosts 102 and 104 may be a computing device, a personal computer, a portable computer, a workstation, a server, a personal digital assistant, a digital camera, or a digital phone as merely a few examples. In one aspect, the data storage system 100 can include more than or less than two hosts (e.g., a single host). As illustrated, DSDs 120, 130, and 140 can each respectively include a non-volatile memory (NVM) 122, 132, and 142 configured to store data.

In some embodiments, the storage management device 110 can learn about the latencies (e.g., guaranteed latencies) of the SSDs of the storage pool 115, based on various interactions with those SSDs. Based on the learned latencies, the storage management device can dynamically select the SSD(s) for new commands (e.g., write commands) where the least amount of head-of-line blocking will be present. In some embodiments, the storage management device 110 can shuffle the commands among the queues to improve loading efficiency of the queues based on the latencies of the DSDs.

Exemplary Queue Architecture of Storage Devices

Figure 2:
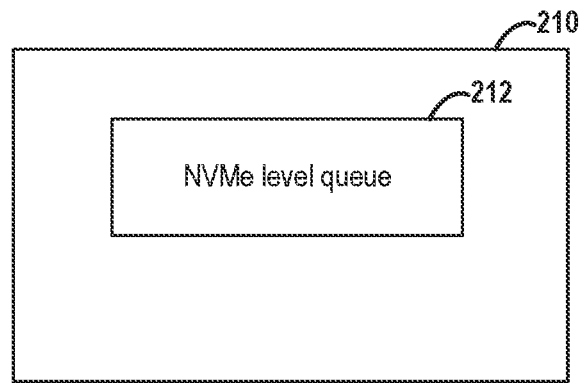
FIG. 2 is a schematic block diagram illustrating exemplary data storage device (DSD) command queue architectures in accordance with some aspects of the disclosure.
Figure 2:
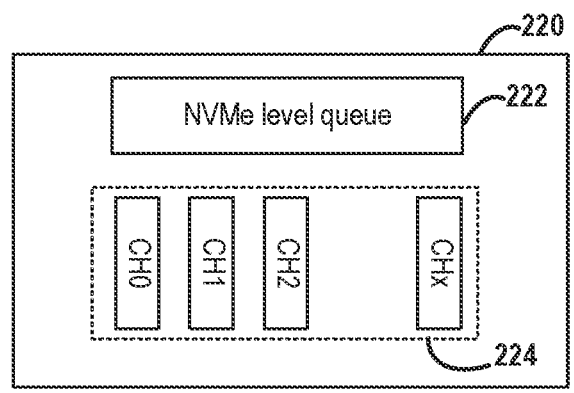
Figure 2:
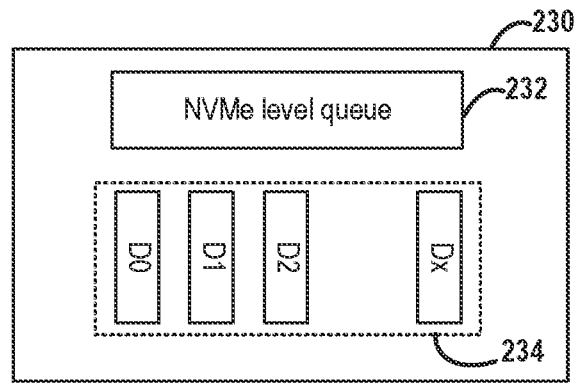

FIG. 2 is a schematic block diagram illustrating exemplary DSD command queue architectures in accordance with some aspects of the disclosure. In one aspect, a first DSD 210 may include an NVMe level queue 212 that can store one or more I/O or host commands received from a storage management device 110. Examples of U/O commands include a read command for reading data from the DSD and a write command (with data) for writing data to the DSD. Each I/O command can be addressed to one or more logical block addresses that correspond to pages or blocks within one or more NAND dies of the DSD. In some examples, the pages or blocks of NAND memory can be organized for access via multiple channels.

In one aspect, a second DSD 220 may include an NVMe level queue 222 that can store one or more I/O commands received from the storage management device 110. The second DSD 220 further includes channel queues 224 (e.g., channel queues CH0, CH1, CH2, . . . , CHx). Each channel queue can store one or more I/O commands. For example, the DSD 220 can take an I/O command from the NVMe level queue 222 and issue it to one of the channel queues 224, which stores the commands to be executed by the NAND dies associated with that channel queue. The channel queues 224 may include parallel queues such that the DSD 220 can perform the I/O commands (e.g., read command, write command) in different channel queues concurrently (i.e., no blocking between queues).

In one aspect, a third DSD 230 may include an NVMe level queue 232 that can store I/O commands received from the storage management device 110. The third DSD 230 further includes die/plane queues 234 (e.g., die queues D0, D1, D2, . . . , Dx). Each die/plane queue can store one or more I/O commands. For example, the third DSD 230 can take an I/O command from the NVMe level queue 232 and issue it to a die/plane queue 234, which stores the commands to be executed by the NAND die(s) associated with that die/plane queue. The die/plane queues 234 are parallel queues such that the DSD 230 can perform the I/O commands (e.g., read command, write command) in different die/plane queues concurrently (i.e., no blocking between queues).

In FIG. 2, each queue may include a plurality of entries (e.g., queue slots) for storing one or more I/O commands (e.g., read command, write command, erase command, etc.). In various embodiments, the queues shown in FIG. 2 may be either physically and/or logically separate. It is also noted that the number of queues may vary from that shown in FIG. 2. In addition, entries within a given queue, or across multiple queues, may be prioritized. For example, read command may have a higher priority than a write command which affects the order within which the commands are issued to the DSD.

Figure 3:
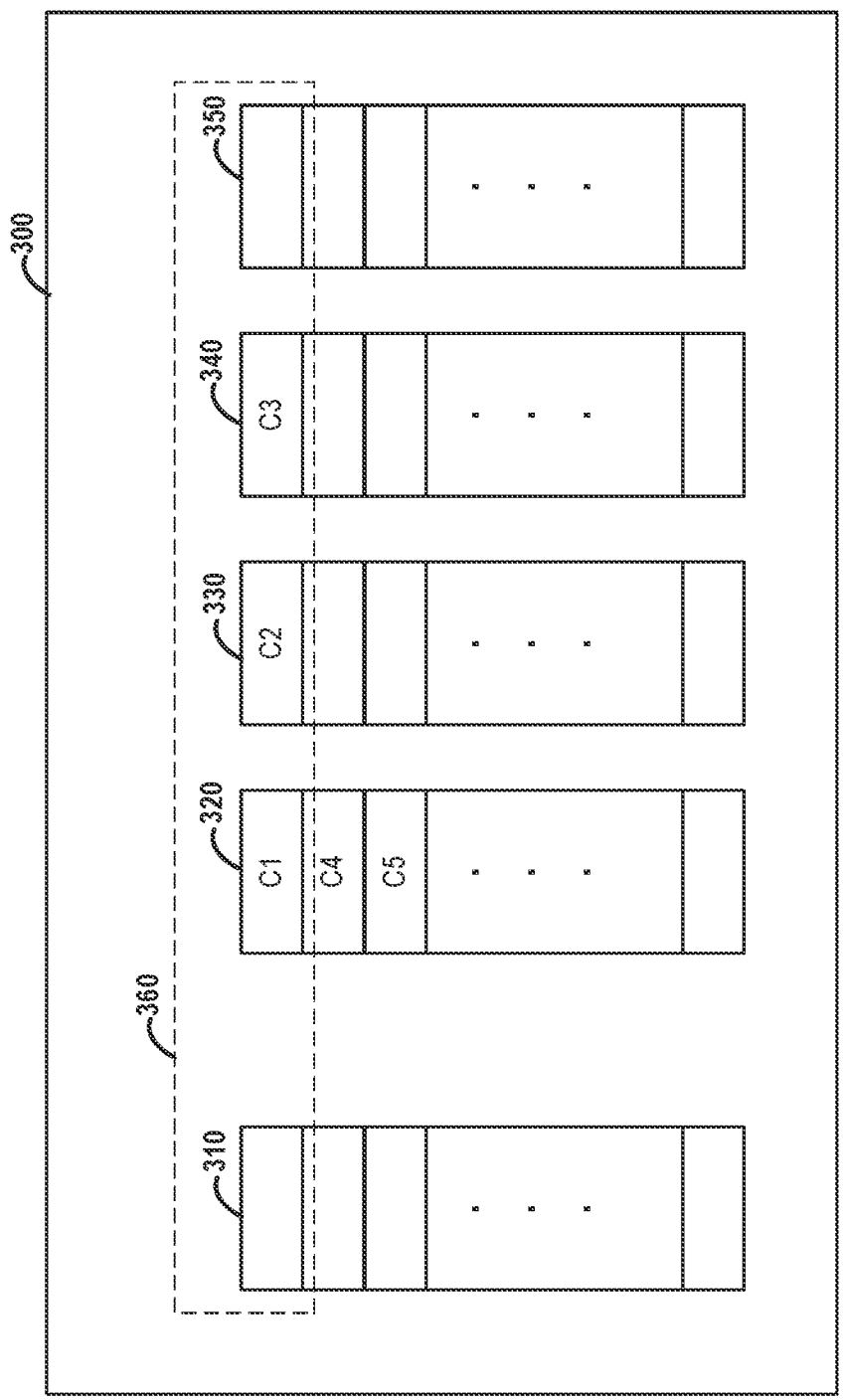
FIG. 3 is a schematic block diagram illustrating an exemplary DSD queue usage scenario in accordance with some aspects of the disclosure.

FIG. 3 is a schematic block diagram illustrating an exemplary DSD queue usage scenario in accordance with some aspects of the disclosure. Referring to FIG. 3, a DSD 300 includes an NVMe level queue 310 (e.g., a queue configured to receive access commands in accordance with the NVMe specification) and four channel queues 320, 330, 340, and 350 (parallel commands queues). The DSD 300 may be any of the DSDs illustrated in FIGS. 1 and 2. In other examples, the DSD 300 may have fewer or more than four channel queues, and the DSD 300 may have more than one NVMe level queue. Each queue has a predetermined number of entries for storing commands. The top entry 360 of each queue is referred to as the head of the queue. The DSD 300 executes the command at the top entry (head of the queue) first before other command(s) in sequence in the same queue. In this example, five commands are already present in the DSD's queues. That is, commands C1, C4, and C5 are in a first channel queue 320, command C2 is in a second channel queue 330, and command C3 is in a third channel queue 340. Commands C1, C2, and C3 are at the head of their respective queues.

In the first channel queue 320, commands C4 and C5 are blocked by command C1. The DDS will execute commands C1, C4, and C5 in this order. Further, any new command issued to the first queue 320 will be blocked by C1, C4, and C5. Similarly, any new command issued to the second queue 330 and third queue 340 will be blocked by the commands C2 and C3 that are already in their respective queue's top entry position. A fourth channel queue 350 is currently empty, therefore, the fourth channel queue 350 has no head-of-line blocking if a new command is issued to this queue. Similarly, the NVMe channel queue 310 is currently empty and has no head-of-line blocking.

In DSD 300, the channel queues 320, 330, 340, 350 are parallel queues that enable command execution in parallel. Using more channel queues concurrently can provide a higher degree of parallel queue usage in command execution. In this disclosure, parallel queue usage indicates the number of queues that contain commands concurrently. In the example shown in FIG. 3, the DSD 300 has five queues 310, 320, 330, 340, and 350 that can be used in parallel, or four queues if queue 310 acts only as a distribution queue that feeds commands to the other queues). Command latency of a queue can be determined based on a queue depth (i.e., number of pending commands in a queue) of the queue. The overall command latency of the DSD for a new command is determined by the time needed to process the commands that are already present in the queue and waiting for execution. For a write command, the DSD has more flexible in issuing the command to a channel queue that has lower latency because the DSD can write the data to any suitable channel. For a read command, however, the DSD will have less flexible because the data must be read from a particular channel associated the data requested.

Monitoring Queues of Storage Devices

In an aspect of the disclosure, it is contemplated that a storage management device can learn the queue information from the DSDs so that the storage management device 110 may implement better VSP management schemes for commands issued to the DSDs. The queue information can provide the storage management device with the current queue status (e.g., head-of-line blocking, parallel queue usage, queue depth, latency, etc.) in each DSD. In a particular embodiment, each DSD in a VSP determines the queue information pertaining to its queue(s), which can be provided to the storage management device 110.

Figure 4:
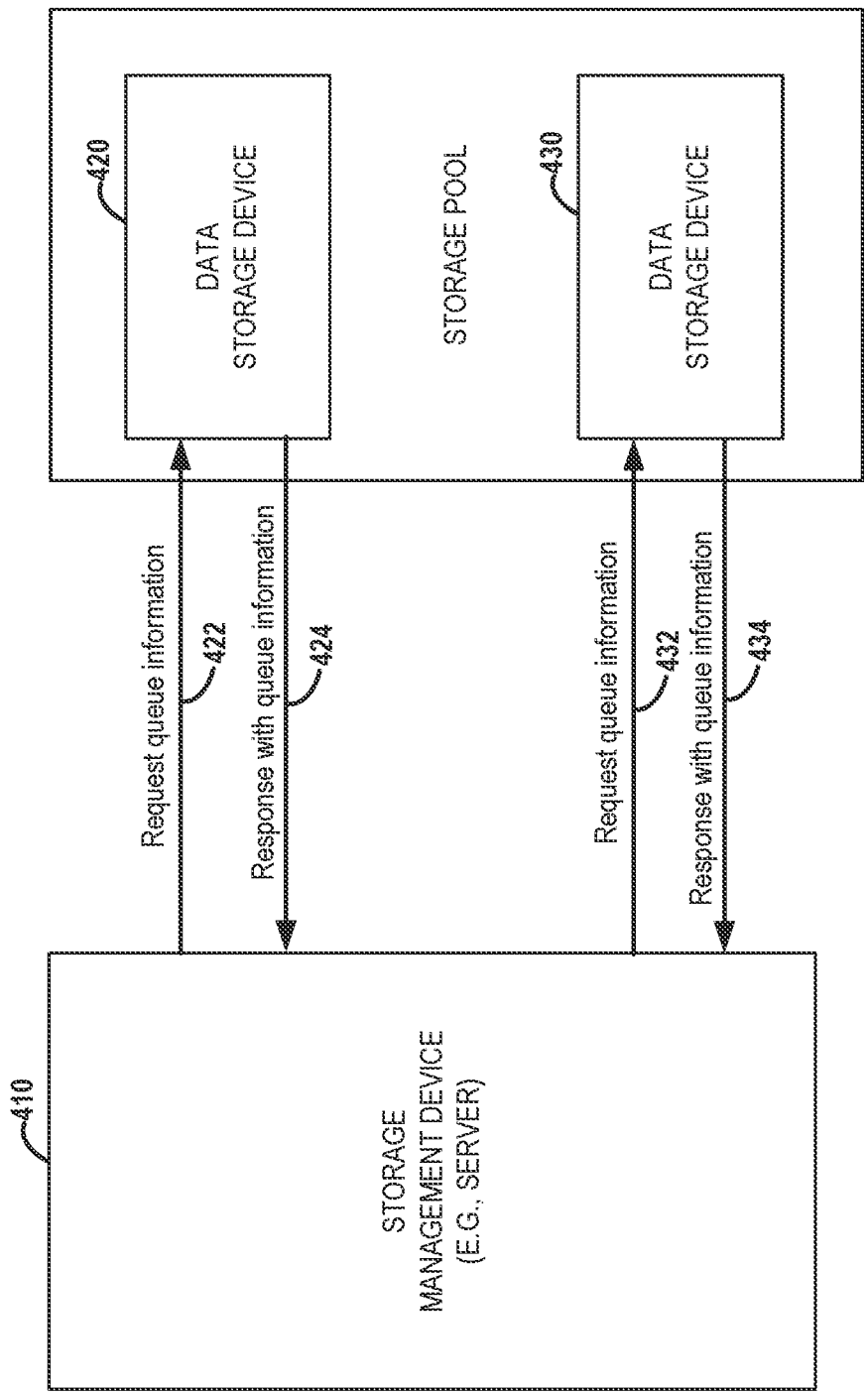
FIG. 4 is a schematic block diagram illustrating exemplary communications between a storage management device and DSDs of a VSP in accordance with some aspects of the disclosure.

FIG. 4 is a schematic block diagram illustrating an exemplary communication between a storage management device 410 and DSDs (e.g., DSDs 420 and 430) in accordance with some aspects of the disclosure. In some examples, the storage management device 410 may be any of the storage management devices of FIGS. 1 and 2, and the DSDs may be any of the DSDs of FIGS. 1-3. As illustrated in FIG. 4, it is contemplated that the storage management device 410 can learn the queue information of the DSDs 420 and 430. To that end, the storage management device 410 can send a queue information request (e.g., requests 422 and 432) to each DSD. In response to the request, each DSD can send its queue information (e.g., responses 424 and 434) to the storage management device 410. In some aspects, the queue information can include various kinds of queue status or information (e.g., head-of-line blocking, parallel queue usage, queue depth, latency, etc.) of the respective DSDs. In some embodiments, the storage management device 410 can communicate with the DSDs 420 and 430 using a data communication interface, for example, Non-Volatile Memory Express (NVMe), Peripheral Component Interconnect Express (PCIe), Serial ATA (SATA), and Serial Attached SCSI (SAS).

In one aspect, the storage management device 410 can request the queue information from a DSD when it is first installed in the VSP and/or at any predetermined time thereafter, during the operation of the DSD. In one aspect, the storage management device 410 can request the queue information periodically or at any predetermined time dynamically. In one aspect, the storage management device 410 can request the queue information before issuing a command (e.g., read command or write command) to any of the DSDs. In one aspect, the storage management device 410 can request the queue information from a specific DSD. In one example, the storage management device 410 can request the queue information from a DSD that stores the data needed for completion of a read command. In one example, the storage management device 410 can request the queue information from one or more DSDs that have available storage space for a write command.

Selecting DSDs Based on Queue Information

In a VSP, as time goes on, the DSDs can have various queue usage (e.g., parallel queue usage, head-of-line blocking, etc.). For example, a certain DSD can have pending commands in all its queues while another DSD can have one or more empty queues (i.e., no head-of-line blocking). As described above, a DSD will have different latency for new commands depending on the current status and utilization of its queues. Aspects of the disclosure provide various techniques for selecting and routing data to a target DSD in a VSP based on current queue usage of the DSDs.

Figure 5:
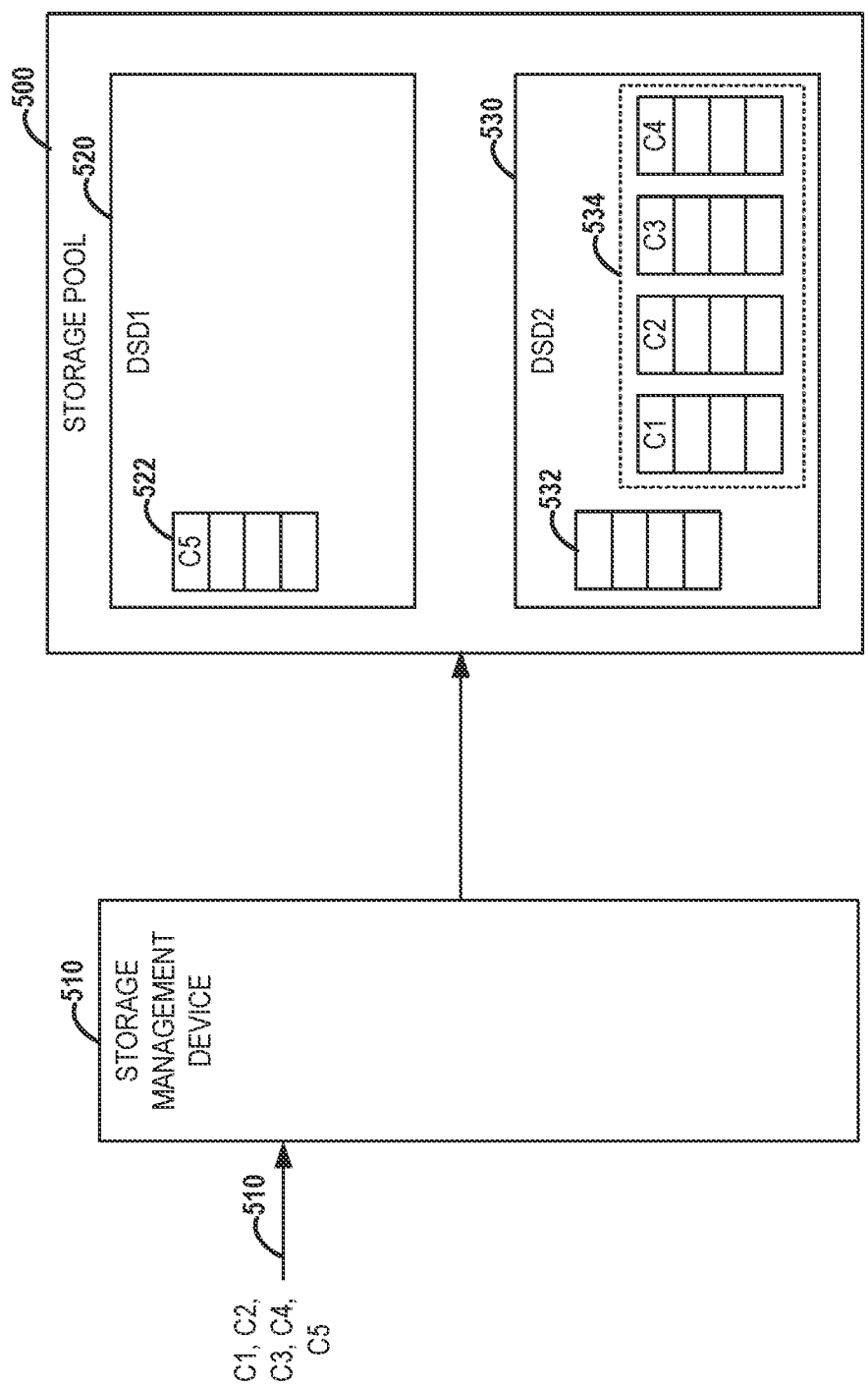
FIG. 5 is a schematic block diagram illustrating an example of storage management device issuing commands to a storage pool based on queue information in accordance with some aspects of the disclosure.

FIG. 5 is a schematic block diagram illustrating an example of issuing commands in a storage pool 500 based on queue information in accordance with some aspects of the disclosure. A storage management device 510 may receive new commands (e.g., C1, C2, C3, C4, and C5) from a host (e.g., host 102/104) that need to be issued to the storage pool 500. The storage pool may include a number of DSDs (e.g., a first DSD 520 and a second DSD 530 shown in FIG. 5). A VSP can be implemented using the storage management device 510 and storage pool 500. The DSDs 520 and 530 may be any of the DSDs (e.g., SSDs) described above in FIGS. 1-4. In some aspects, the DSDs 520 and 530 may have the same or different queue architectures. For the example of FIG. 5, the first DSD 520 may only have an NVMe level queue 522, the second DSD 530 may have a queue 532 at the NVMe level and a number of queues 534 (parallel queues) at the channel level, die level, and/or plane level.

The storage management device 510 can learn about the queue information of the DSDs as described above in relation to FIG. 4. In some aspects, the storage management device 510 can issue the commands C1, C2, C3, and C4 to the second DSD 530 that can distribute the commands C1, C2, C3, and C4 in different queues to utilize the queues in parallel (i.e., increase parallel queue usage). In this case, there is no head-of-line blocking for these commands, because each of the commands C1, C2, C3, and C4 is in a different queue. Then, the storage management device 510 can issue the command C5 to the first DSD 520 that can store the command C5 in its NVMe level queue 522 to avoid the head-of-line blocking that would have occurred if the command C5 had instead been sent to the second DSD 530. In this case, the storage management device 510 can reduce the overall latency of the storage pool 500 by efficiently utilizing all of the available queues in the DSDs to avoid head-of-line blocking and increase parallel queue usage.

Exemplary Storage Management Device

Figure 6:
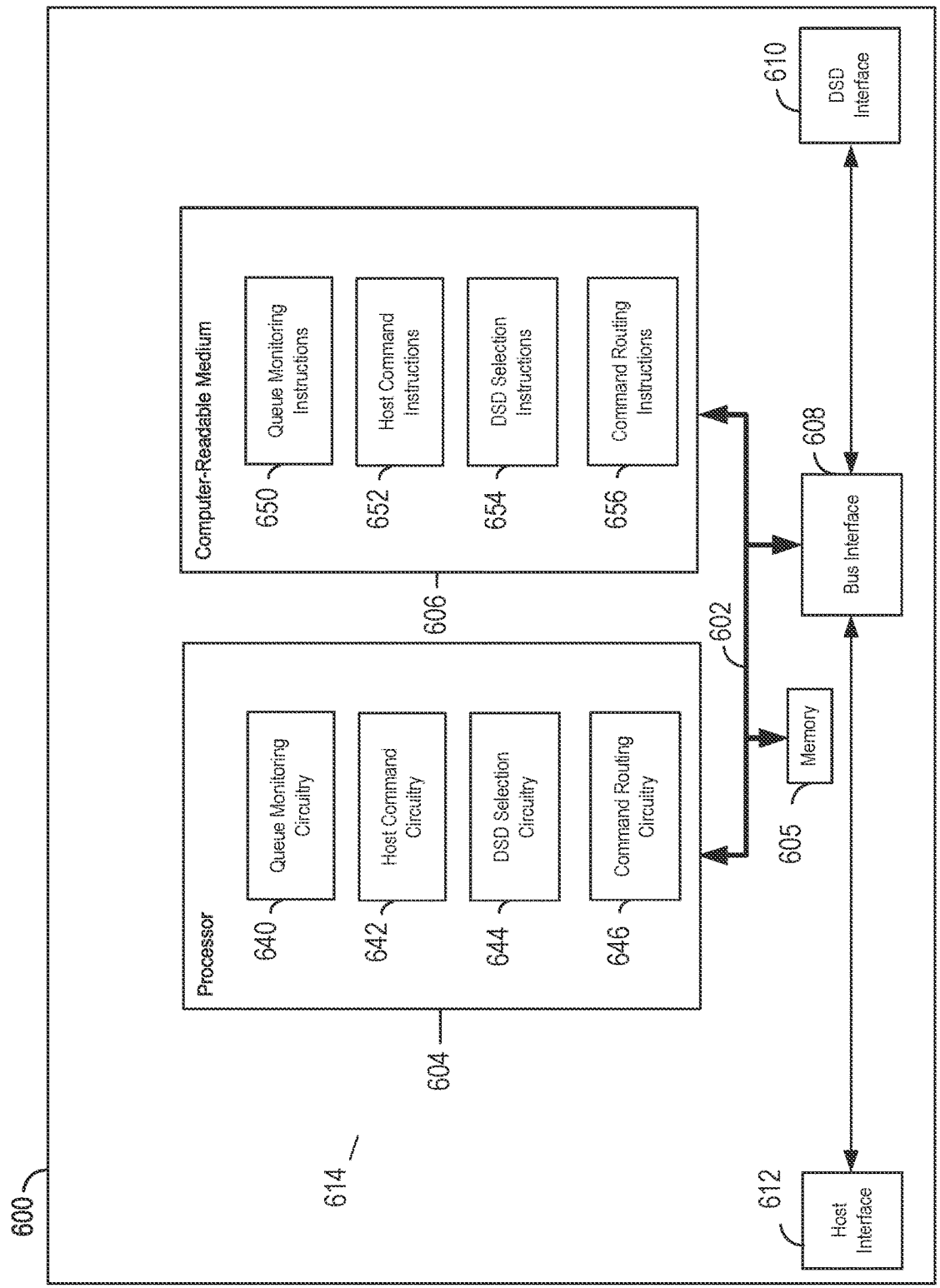
FIG. 6 is a block diagram illustrating an example of a hardware implementation for a storage management device in accordance with some aspects of the disclosure.

FIG. 6 is a block diagram illustrating an example of a hardware implementation for a storage management device 600 employing a processing system 614. For example, the storage management device 600 may be a storage management device (e.g., a server) as illustrated in any one or more of the figures disclosed herein.

The storage management device 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the storage management device 600 may be configured to perform any one or more of the functions described herein. That is, the processor 604, as utilized in a storage management device 600, may be used to implement any one or more of the processes, methods, and procedures described and illustrated in the figures disclosed herein.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a DSD interface 610 (e.g., an interface which emulates a host). The DSD interface 610 provides a communication interface or means for communicating over a transmission medium with various other DSDs (e.g., any of DSDs 120, 130, and/or 140 illustrated in FIG. 1). Similarly, bus interface 608 provides an interface between the bus 602 and a host interface 612, wherein the host interface 612 provides a communication interface or means for communicating over a transmission medium with various other hosts (e.g., any of hosts 102 and/or 104 illustrated in FIG. 1). Either of host interface 612 or DSD interface 610 can be implemented using any of the interface technologies, for example, PCIe, NVMe, etc.

In some aspects of the disclosure, the processor 604 may include queue monitoring circuitry 640 configured for various functions, including, for example, monitoring queue usage and latency of a plurality of DSDs (e.g., any of the DSDs illustrated in FIGS. 1-5). The processor 604 may further include host command circuitry 642 configured for various functions, including, for example, to receive host commands (e.g., read and write commands, write data for write commands) from a host device (e.g., hosts 102 or 104 illustrated in FIG. 1) to be issued to the DSDs. As illustrated, the processor 604 may also include DSD selection circuitry 644 configured for various functions. For instance, the DSD selection circuitry 644 may be configured to select, based on the queue information of the plurality of DSDs, a target DSD for receiving the host command (and write data for a write command). The processor 604 may further include command routing circuitry 646 configured for various functions, including, for example, to send the host command to the target/selected DSD (e.g., send a read/write command to the target DSD). It should also be appreciated that, the combination of the queue monitoring circuitry 640, the host command circuitry 642, the DSD selection circuitry 644, and the command routing circuitry 646 may be configured to implement one or more of the functions described herein.

Various other aspects of the storage management device 600 are also contemplated. For instance, some aspects are directed towards determining which of a plurality of DSDs to select as the target DSD based on queue information. In a particular implementation, the processor 604 may be configured to identify a DSD having a lowest overall latency based on head-of-line blocking status and parallel queue usage, and the processor 604 selects such DSD to receive the new command to minimize head-of line blocking and/or maximize parallel queue usage among the DSDs.

Referring back to the remaining components of storage management device 600, it should be appreciated that the processor 604 is responsible for managing the bus 602 and general processing, including the execution of software stored on the computer-readable medium 606. The software, when executed by the processor 604, causes the processing system 614 to perform the various functions described herein for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include queue monitoring instructions 650 configured for various functions, including, for example, to determine and monitor latency and queue usage of DSDs (e.g., any of DSDs illustrated in FIGS. 1-5). The computer-readable storage medium 606 may further include host command instructions 652 configured for various functions, including, for example, to receive host command and data from a host device (e.g., hosts 102 or 104 illustrated in FIG. 1) to be stored in one or more of DSDs. As illustrated, the computer-readable storage medium 606 may also include DSD selection instructions 654 configured for various functions. For instance, the DSD selection instructions 654 may be configured to select, based on the queue information (e.g., latency and queue usage) of the plurality of DSDs, a target DSD to receive the new command from a host. The computer-readable storage medium 606 may further include command routing instructions 656 configured for various functions, including, for example, to issue the host command (and data for write command) to the target DSD.

Figure 7:
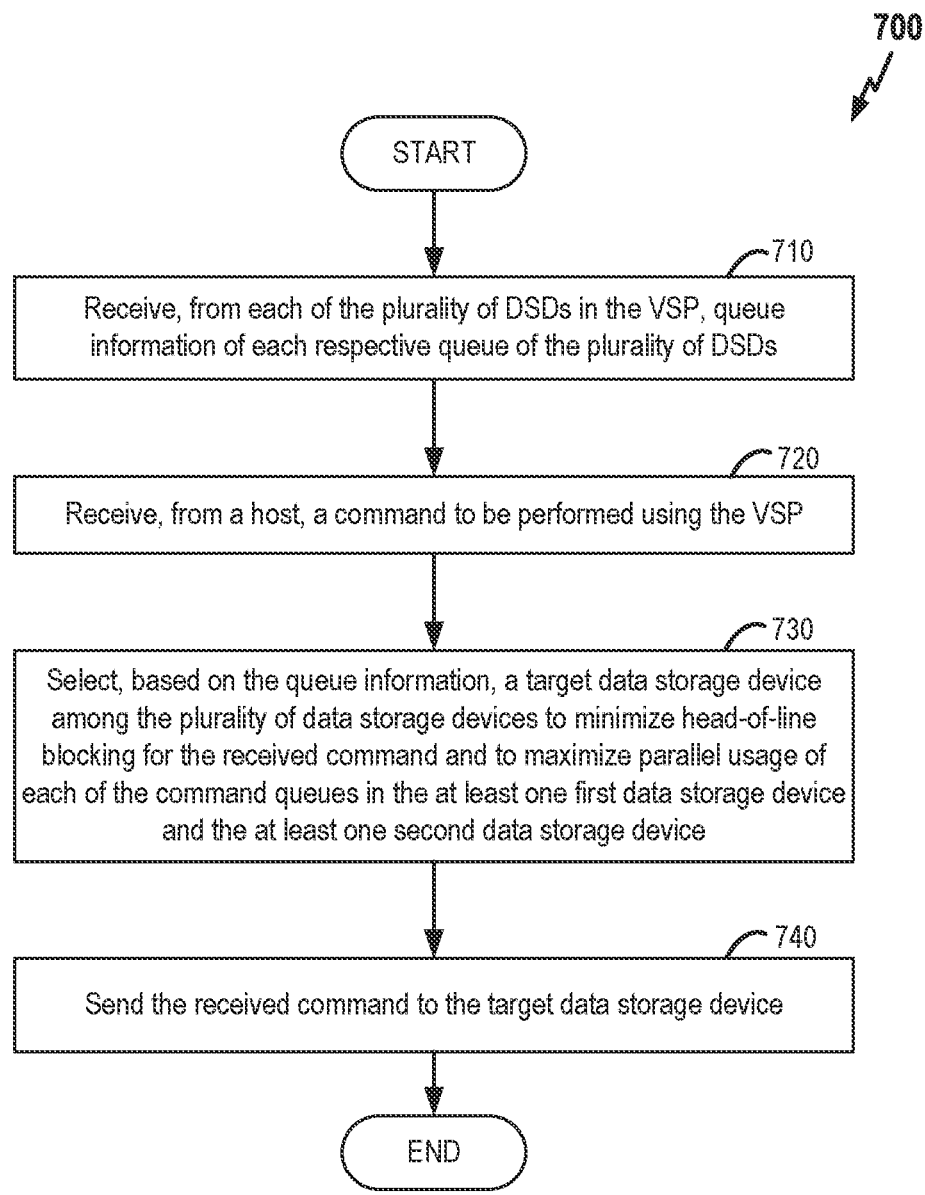
FIG. 7 is a flow chart illustrating a method of selecting a target DSD in a VSP for a host command based on queue information in accordance with some aspects of the disclosure.

FIG. 7 is a flow chart illustrating a method 700 of sending a command to a DSD in a VSP based on queue information in accordance with some aspects of the disclosure. The method 700 can be implemented using the data storage system described above in relation to FIGS. 1-6 or any suitable data storage systems. In some aspects, a data storage system includes a storage management device 600 that can issue commands to a storage pool that includes a plurality of data storage devices (DSDs). A VSP can be implemented using the storage management device 600 and the storage pool. In some examples, each DSD may have one or more queues, for example, NVMe level queue, channel level queue, die level queue, and/or plane level queue. In one embodiment, the storage pool includes a plurality of DSDs, each including NVM. The plurality of DSDs includes at least one first data storage device each comprising a single command queue (e.g., queue 522 of FIG. 5) and at least one second data storage device each including a plurality of command queues (e.g., queue 533, 534 of FIG. 5).

At block 710, the method includes receiving, from each of the plurality of DSDs in the VSP, queue information of each respective queue of the plurality of DSDs. In one example, the queue monitoring circuitry 640 (FIG. 6) can provide a means to receive the queue information via the DSD interface 610. For example, the queue monitoring circuitry 640 can send a queue information request (e.g., requests 422 and 432 of FIG. 4) to each DSD. In response to the request, the queue monitoring circuitry 640 can receive queue information (e.g., responses 424 and 434 of FIG. 4) from each DSD. In some aspects, the queue information can include various queue information of the DSD, for example, head-of-line blocking, parallel queue usage, queue depth, latency, etc. In some aspects, the DSDs may have different latency due to different queue usage and/or different queue architectures.

At block 720, the method includes receiving, from a host, a command to be performed using the VSP. In one example, the host command circuitry 642 (FIG. 6) can provide a means to receive the command via the host interface 612. In one example, the command may include a read command for reading data from the VSP. In one example, the host command may include a write command to write data to the VSP. The host command may include the write data to be written to the VSP.

A block 730, the method includes selecting, based on the queue information, a target DSD among the plurality of DSDs to minimize head-of-line blocking for the received command and to maximize parallel usage of each of the command queues in the at least one first data storage device and the at least one second data storage device. In one example, the DSD selection circuitry 644 (FIG. 6) can provide a means to select the target DSD based on the queue information. In some aspects, the queue information can include various queue status or latency information (e.g., head-of-line blocking, parallel queue usage, queue depth, command latency, etc.) of the DSDs in the VSP.

At block 740, the method concludes with sending the received command to the target DSD. In one example, the command routing circuitry 646 (FIG. 6) can provide a means to send the received command to the target DSD via the DSD interface 610. In some examples, the command may be a write command to write data to the VSP.

In one aspect, the method 700 can include selecting the target DSD with at least one empty command queue. In one aspects, the method 70) can include selecting the target DSD with a queue depth less than that of other data storage devices among the plurality of data storage devices. In one aspect, the method 700 can include selecting the target DSD that includes more queues than other DSDs among the plurality of DSDs. In one aspect, the method 700 can include sending queue selection indication to the DSD, the queue selection indication identifying a queue of the target DSD for receiving the command. In one aspect, the queue information can indicate command latency information of the plurality of DSDs. In one aspect, the queue information indicates at least one of a head-of-line blocking condition in each of the plurality of data storage devices or a queue depth of each of the plurality of data storage devices. In one aspect, the head-of-line blocking is indicative of a quantity of pending commands in a respective queue of the plurality of DSDs, wherein the head-of-line blocking exists when the quantity is greater than zero. In one aspect, the method further include determining, based on the queue information, the parallel usage of the command queues of the plurality of data storage devices, wherein the parallel usage is indicative of a quantity of command queues containing pending commands among the plurality of data storage devices. In one aspect, the parallel usage is indicative of a quantity of command queues containing pending commands among the plurality of command queues of the at least one second data storage device. In one aspect, the method 700 further includes selecting the target DSD that results in an increase of the parallel usage of the plurality of DSDs. In one aspect, the method 700 can include selecting the target DSD with a command queue that contains no more than the fewest number of commands among the command queues of the plurality of data storage devices.

Figure 8:
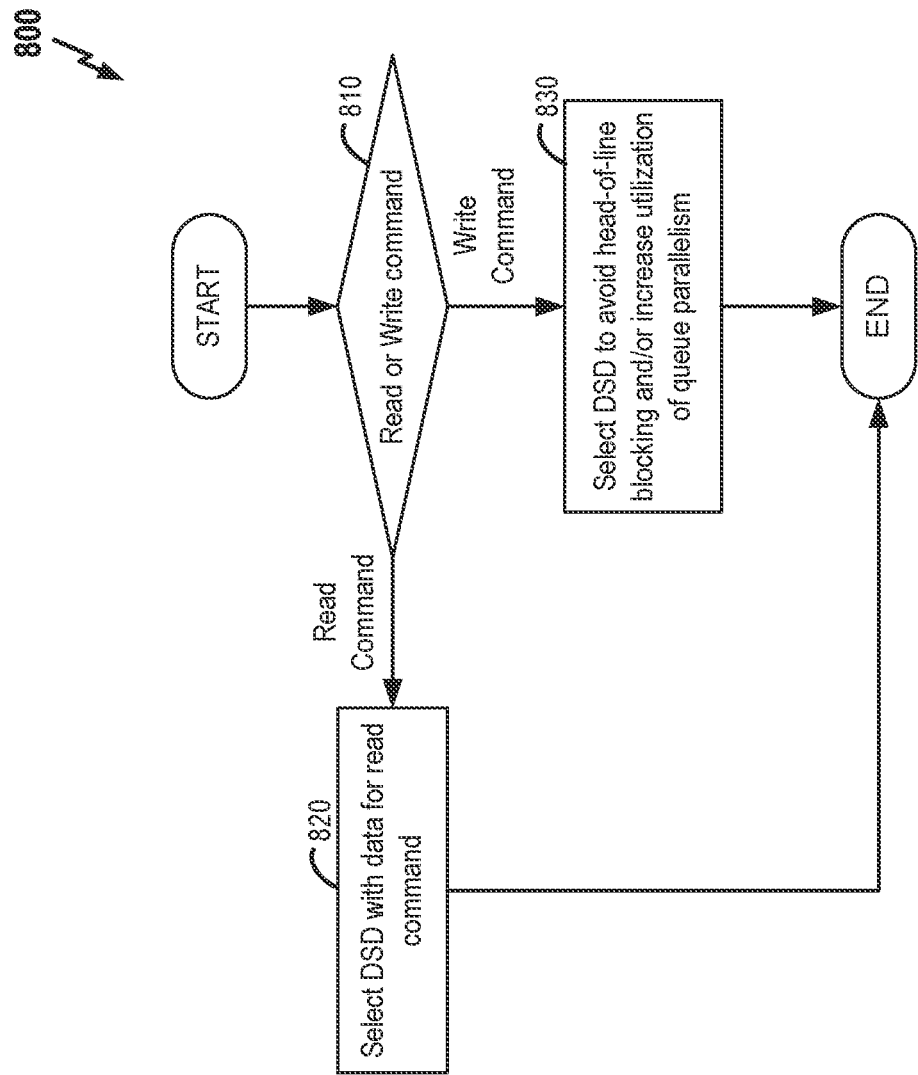
FIG. 8 is a flow chart illustrating a method of selecting a target DSD in a VSP for a host command based on the type of command and queue information in accordance with some aspects of the disclosure.

FIG. 8 is a flow chart illustrating a method 800 of selecting a DSD in a VSP based on queue information in accordance with some aspects of the disclosure. The method 800 can be implemented using any of the storage management devices described above in relation to FIGS. 1-6. In some aspects, the method 800 can be used in block 730 of the method 700 described above to select a DSD.

At decision block 810, the storage management device can determine if a received command (e.g., host command) is a read command or a write command. A read command is used to read data from the VSP, and a write command is used to write data (e.g., included in the write command) to the VSP. In one example, the host command circuitry 642 can provide a means to determine the type (read or write) of the command. At block 820, if the command is a read command, the storage management device selects a DSD in the VSP where the requested data is stored. For a read command, the storage management is restricted to select the DSD stored with the requested data.

At block 830, if the command is a write command, the storage management device can select a DSD to reduce (or avoid) head-of-line blocking and/or maximize parallel queue usage the DSDs in the VSP. For a write command, the storage management device may have more flexibility in selecting the DSD to store the data that can result in reduced overall latency of the command. The storage management device can determine the queue usage of the DSDs by sending a queue information request (e.g., requests 422 and 432) to each DSD. In response to the request, each DSD can send its queue information (e.g., responses 424 and 434) to the storage management device. The storage management device may request the queue information periodically, aperiodically, and/or for certain events (e.g., before each write or read command is issued to the VSP).

Exemplary Data Storage Device

Figure 9:
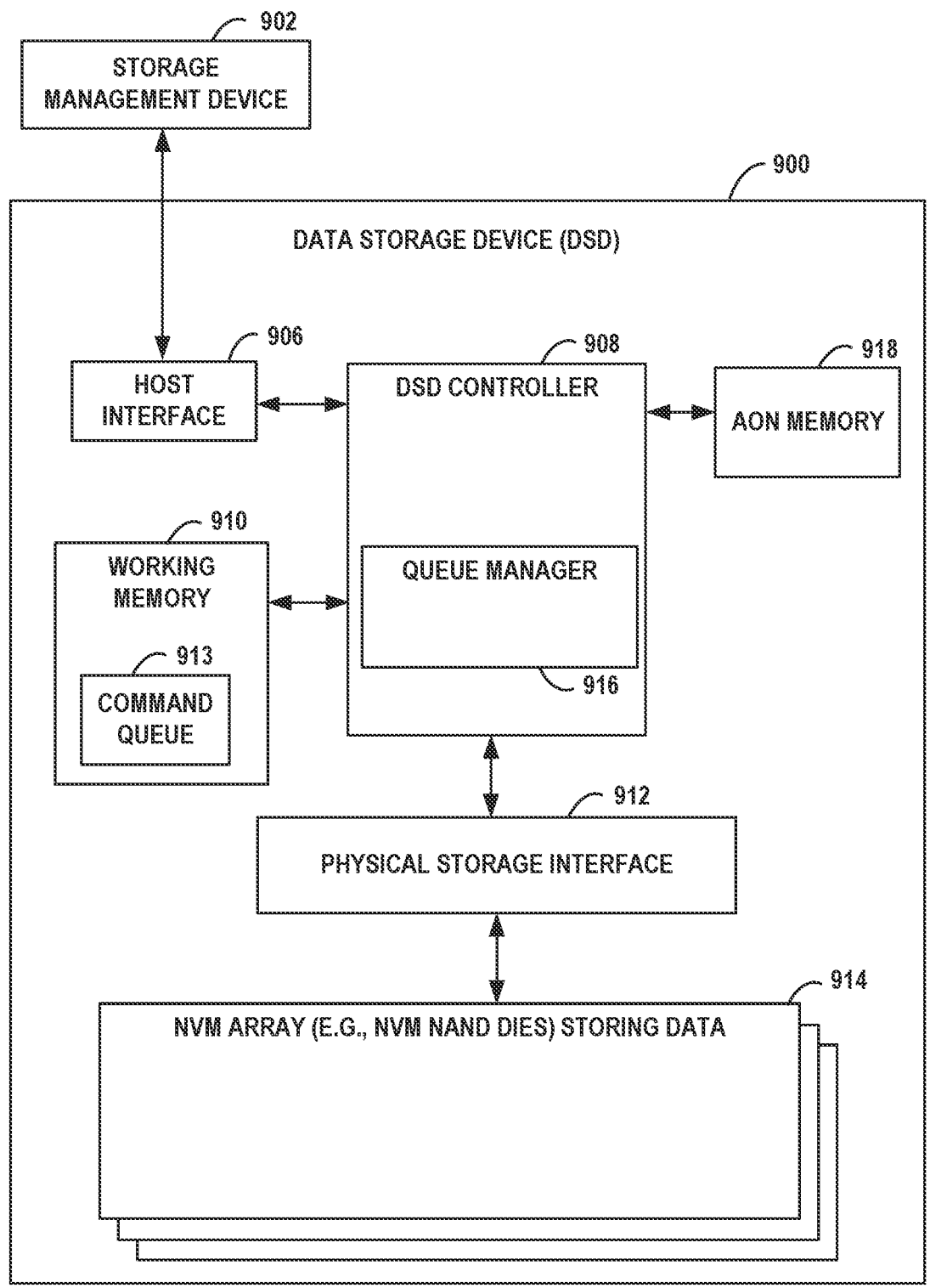
FIG. 9 is a schematic block diagram illustrating an exemplary DSD configured to provide queue information in accordance with some aspects of the disclosure.

FIG. 9 is a schematic block diagram illustrating an exemplary DSD 900 configured to provide queue information in accordance with some aspects of the disclosure. The DSD 900 can be any of the DSDs included in a VSP described above in relation to FIGS. 1-5. In one example, a storage management device 902 may send a write command to the DSD 900 for writing data to the DSD or a read command to the DSD for reading data from the DSD. The storage management device 902 may be any system or device having a need for data storage or retrieval and a compatible interface for communicating with the DSD 900.

The DSD 900 includes a host interface 906, a DSD controller 908, a working memory 910 (such as dynamic random access memory (DRAM) or other volatile memory), a physical storage (PS) interface 912 (e.g., flash interface module (FIM)), and an NVM array 914 having one or more dies (e.g., NAND flash dies) storing data. The host interface 906 is coupled to the controller 908 and facilitates communication between the storage management device 902 and the controller 908. The controller 908 is coupled to the working memory 910 as well as to the NVM array 914 via the PS interface 912. The DSD 900 may include a command queue 913 for storing commands (e.g., read commands and write commands) received from the storage management device. In some aspects, the command queue 913 may include any combinations of one or more NVMe level queues (e.g., queue 222, 232 of FIG. 2), channel level queues, die level queues, and/or plane level queues (e.g., queues 224 and 234 of FIG. 2). In some aspects, the command queue 913 may be provided in the working memory 910 (example shown in FIG. 9), the AON memory 918, or a separate memory (not shown).

The host interface 906 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an Institute of Electrical and Electronics Engineers (IEEE) 1394 (Firewire) interface, Secure Digital (SD), or the like. In some embodiments, the storage management device 902 can include the DSD 900. In other embodiments, the DSD 900 is remote from the storage management device 902 or is contained in a remote computing system communicatively coupled with the storage management device 902. For example, the storage management device 902 may communicate with the DSD 900 through a wireless communication link. The NVM array 914 may include multiple dies that may be organized in multiple planes.

Although, in the example illustrated in FIG. 9, the DSD 900 includes a single channel between the controller 908 and NVM array 914 via a PS interface 912, the subject matter described herein is not limited to having a single memory channel. For example, in some NAND memory system architectures, two, four, eight, or more NAND channels couple the controller and the NAND memory device, depending on controller capabilities. In any of the embodiments described herein, more than a single channel may be used between the controller and the memory die, even if a single channel is shown in the drawings. The controller 908 may be implemented in a single integrated circuit chip and may communicate with different layers or dies of memory in the NVM 914 over one or more command channels.

The controller 908 controls the operation of the DSD 900. In various aspects, the controller 908 receives commands from the storage management device 902 through the host interface 906 and performs the commands to transfer data between the storage management device 902 and the NVM array 914. Furthermore, the controller 908 may manage reading from and writing to the working memory 910 for performing the various functions effected by the controller and to maintain and manage cached information stored in the working memory 910.

The controller 908 may include any type of processing device, such as a microprocessor, a microcontroller, an embedded controller, a logic circuit, software, firmware, or the like, for controlling the operation of the DSD 904. In some aspects, some or all of the functions described herein as being performed by the controller 908 may instead be performed by another element of the DSD 904. For example, the DSD 904 may include a microprocessor, a microcontroller, an embedded controller, a logic circuit, software, firmware, application specific integrated circuit (ASIC), or any kind of processing device, for performing one or more of the functions described herein as being performed by the controller 908. According to other aspects, one or more of the functions described herein as being performed by the controller 908 may instead be performed by the storage management device 902. In still further aspects, some or all of the functions described herein as being performed by the controller 908 may instead be performed by another element such as a controller in a hybrid drive including both non-volatile memory elements and magnetic storage elements. The DSD controller 908 includes a queue manager 916, which can be configured to perform queue management and monitoring as described herein, for example, in relation to FIGS. 1-8. In one aspect, the queue manager 916 can monitor and keep queue information (e.g., head-of-line blocking, parallel queue usage, queue depth, latency, etc.) in an always ON (AON) memory 918, working memory 910, or other suitable memory such as the NVM array 914.

In one aspect, the queue manager 916 is a module, software, and/or firmware within the DSD controller 908. In one aspect, the queue manager 916 may be a separate component from the DSD controller 908 and may be implemented using any combination of hardware, software, and firmware (e.g., like the implementation options described above for DSD controller 908) that can perform queue management as will be described in further detail herein. In one example, the queue manager 916 is implemented using a firmware algorithm or other set of instructions that can be performed on the DSD controller 908 to implement the queue management functions described herein.

The working memory 910 may be any suitable memory, computing device, or system capable of storing data. For example, working memory 910 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 908 uses the working memory 910, or a portion thereof, to store data during the transfer of data and/or commands between the storage management device 902 and the DSD 900 or NVM array 914 (e.g., via the queue 913). For example, the working memory 910 or a portion of the volatile memory 910 may be used as a cache memory. The NVM array 914 receives data from the controller 908 via the PS interface 912 and stores the data. In some embodiments, working memory 910 may be replaced by a non-volatile memory such as MRAM, PCM, ReRAM, etc. to serve as a working memory for the overall device.

The NVM array 914 may be implemented using flash memory (e.g., NAND flash memory). In one aspect, the NVM array 914 may be implemented using any combination of NAND flash, PCM arrays, MRAM arrays, and/or ReRAM.

The PS interface 912 provides an interface to the NVM array 914. For example, in the case where the NVM array 914 is implemented using NAND flash memory, the PS interface 912 may be a flash interface module. In one aspect, the PS interface 912 may be implemented as a component of the DSD controller 908.

In the example of FIG. 9, the controller 908 may include hardware, firmware, software, or any combinations thereof that provide the functionality for the queue manager 916.

Although FIG. 9 shows an exemplary DSD and a DSD is generally used as an illustrative example in the description throughout, the various disclosed embodiments are not necessarily limited to a DSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the DSD controller 908 may be a controller in another type of device and still be configured to manage queue latency and utilization, and perform/control some or all of the other functions described herein.

The AON memory 918 may be any suitable memory, computing device, or system capable of storing data with a connection to power that does not get switched off. For example, AON memory 918 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory 918 may be a RAM with a continuous power supply (e.g., a connection to power that cannot be switched off unless there is a total loss of power to the DSD, such as during a graceful or ungraceful shutdown). In some aspects, the AON memory 918 is an optional component. Thus, in at least some aspects, the DSD 904 does not include the AON memory 918.

Figure 10:
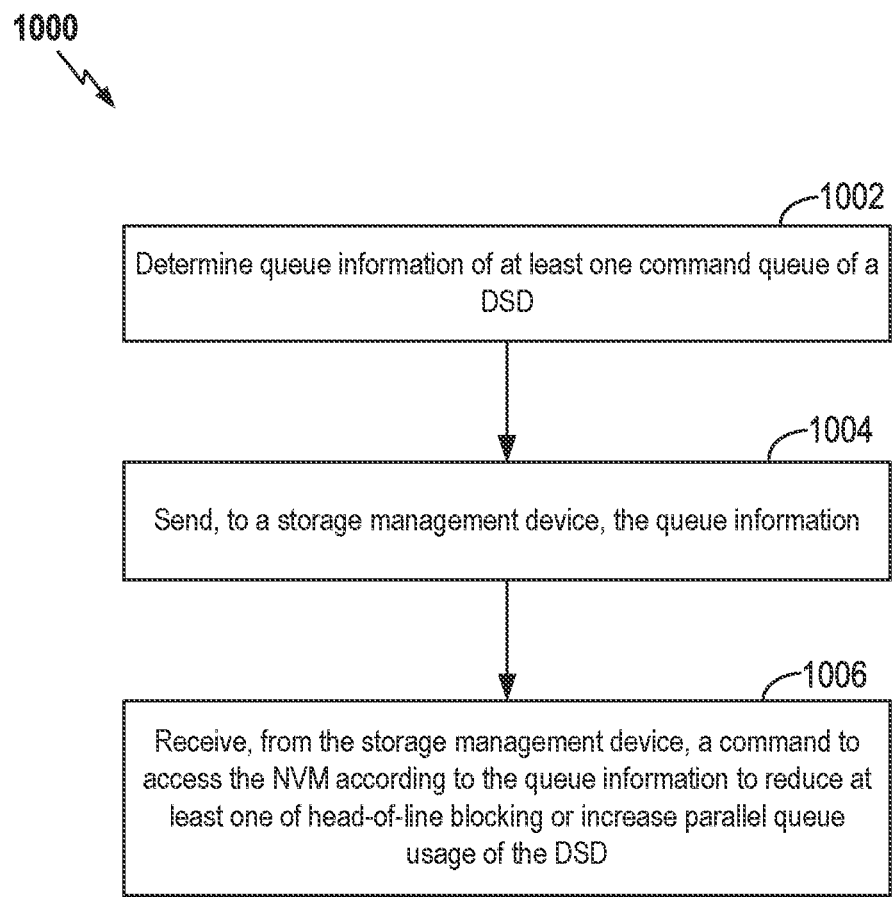
FIG. 10 is a flowchart illustrating a method for providing queue information at a DSD in accordance with some aspects of the disclosure.

FIG. 10 is a flowchart illustrating a method 1000 for providing queue information that may be performed by a DSD in accordance with some aspects of the disclosure. In one aspect, the process 1000 may be performed by the DSD controller 908 (or queue manager 916) of FIG. 9 or any other suitably equipped device. The NVM described for process 1000 can be the working NVM of the DSD such as NVM arrays 914 of FIG. 9. In some aspects, the DSD or a data storage device includes an NVM, one or more command queues configured to store commands (received from a storage management device) for accessing the NVM, and a processor coupled to the at least one command queue.

At block 1002, the method includes determining queue information of one or more command queues of the DSD. In one aspect, the queue manager 916 can provide a means to determine the queue information of the command queue(s) (e.g., queue 913). The queue information can indicate various queue status or latency information (e.g., head-of-line blocking, parallel queue usage, queue depth, latency etc.) of the DSD.

At block 1004, the method includes sending, to a storage management device, queue information. In one aspect, the DSD controller 908 can provide a means to send the queue information, for example, using the host interface 906. In one example, the DSD may send the queue utilization information (e.g., responses 424 and 434 of FIG. 4) in response to receiving a latency information request (e.g., requests 422 and 432 of FIG. 4) from a storage management device (e.g., device 110 of FIG. 1, device 410 of FIG. 4, device 510 of FIG. 5, and device 600 of FIG. 6).

At block 1006, the method includes receiving, from the storage management device, a command to access the NVM according to the queue information to reduce at least one of head-of-line blocking of the at least one command queue or increase a parallel queue usage of the DSD. In one aspect, the DSD controller 908 can provide a means to receive the command from the storage management device using the host interface 906. In one example, the command may be a read command for retrieving data stored in the NVM. In one example, the command may be a write command with data to be stored in the NVM. The write command may direct the DSD to store the command in a particular command queue to reduce/avoid head-of-line block. The write command can also direct the DSD to store the command in a certain queue to increase parallel queue usage. In one aspect, the DSD may perform method 1000 in response to a request for queue information from the storage management device, as shown in FIG. 4 for example.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including." "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof.

Moreover, it is understood that the word "or" has the same meaning as the Boolean operator "OR." that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A. B, and C" or "one or more of A. B. or C" is intended to cover A, B, C, A-B, A-C, B-C, and A-B-C, as well as multiples of the same members. Similarly, as used herein, a phrase referring to a list of items linked with "and/or" refers to any combination of the items. As an example. "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example. "determining" may include calculating, computing, processing, deriving, investigating, looking up (e.g., looking up in a table, a database, a datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage system, comprising:
a storage pool (SP) comprising a plurality of data storage devices, each data storage device comprising a non-volatile memory (NVM); and
   wherein the plurality of data storage devices comprises:
      at least one first data storage device, each first data storage device comprising a single command queue; and
      at least one second data storage device, each second data storage device comprising a plurality of command queues;
a storage management device configured to:
   receive, from each of the plurality of data storage devices in the SP, queue information of each respective command queue of the plurality of data storage devices;

receive, from a host, a command to be performed using the SP;

select, based on the queue information, a target data storage device among the plurality of data storage devices to minimize head-of-line blocking for the received command and to maximize parallel usage of each of the command queues in the at least one first data storage device and the at least one second data storage device, wherein the storage management device is further configured to select the target data storage device that includes more command queues than other data storage devices among the plurality of data storage devices; and send the received command to the target data storage device.

2. The data storage system of claim 1, wherein the storage management device is further configured to, at least one of:

select the target data storage device with at least one empty command queue; or select the target data storage device with a queue depth less than that of other data storage devices among the plurality of data storage devices.

3. The data storage system of claim 1, wherein the storage management device is further configured to:

send a queue selection indication to the target data storage device, the queue selection indication identifying a command queue of the target data storage device for receiving the command.

4. The data storage system of claim 1, wherein the queue information indicates command latency information of the plurality of data storage devices.

5. The data storage system of claim 1, wherein the queue information indicates at least one of:

a head-of-line blocking in each of the plurality of data storage devices; or a queue depth of each of the plurality of data storage devices.

6. The data storage system of claim 5, wherein the head-of-line blocking is indicative of a quantity of pending commands in a respective command queue of the plurality of data storage devices, wherein the head-of-line blocking exists when the quantity is greater than zero.

7. The data storage system of claim 1, wherein the storage management device is further configured to:

determine, based on the queue information, the parallel usage of the command queues of the plurality of data storage devices, wherein the parallel usage is indicative of a quantity of command queues containing pending commands among the plurality of data storage devices.

8. The data storage system of claim 7, wherein the parallel usage is indicative of a quantity of command queues containing pending commands among the plurality of command queues of the at least one second data storage device.

9. The data storage system of claim 7, wherein the storage management device is further configured to:

select the target data storage device that results in an increase of the parallel usage of the plurality of data storage devices.

10. The data storage system of claim 7, wherein the storage management device is further configured to:

select the target data storage device with a command queue that contains no more than the fewest number of commands contained in any one of all of the command queues of the plurality of data storage devices.

11. A method of operating a data storage system comprising a storage pool (SP), the SP comprising a plurality of data storage devices, each data storage device comprising a non-volatile memory (NVM), wherein the plurality of data storage devices comprises:

at least one first data storage device, each first data storage device comprising a single command queue; and at least one second data storage device, each second data storage device comprising a plurality of command queues;

the method comprising:

receiving, from each of the plurality of data storage devices in the SP, queue information of each respective command queue of the plurality of data storage devices;

receiving, from a host, a command to be performed using the SP;

selecting, based on the queue information, a target data storage device among the plurality of data storage devices to minimize head-of-line blocking for the received command and to maximize parallel usage of each of the command queues in the at least one first data storage device and the at least one second data storage device, wherein the selecting the target data storage device comprises selecting the target data storage device that includes more command queues than other data storage devices among the plurality of data storage devices; and sending the received command to the target data storage device.

12. The method of claim 11, wherein the selecting the target data storage device further comprises at least one of:

selecting the target data storage device with at least one empty command queue; or selecting the target data storage device with a queue depth less than that of other data storage devices among the plurality of data storage devices.

13. The method of claim 11, further comprising:

sending a queue selection indication to the target data storage device, the queue selection indication identifying a command queue of the target data storage device for receiving the command.

14. The method of claim 11, wherein the queue information indicates command latency information of the plurality of data storage devices.

15. The method of claim 11, wherein the queue information indicates at least one of:

a head-of-line blocking in each of the plurality of data storage devices; or a queue depth of each of the plurality of data storage devices.

16. The method of claim 15, wherein the head-of-line blocking is indicative of a quantity of pending commands in a respective command queue of the plurality of data storage devices, wherein the head-of-line blocking exists when the quantity is greater than zero.

17. The method of claim 11, further comprising:

determining, based on the queue information, the parallel usage of the command queues of the plurality of data storage devices, wherein the parallel usage is indicative of a quantity of command queues containing pending commands among the plurality of data storage devices.

18. The method of claim 17, wherein the parallel usage is indicative of a quantity of command queues containing pending commands among the plurality of command queues of the at least one second data storage device.

19. The method of claim 17, further comprising:
selecting the target data storage device with a command queue that contains no more than the fewest number of commands contained in any one of all of the command queues of the plurality of data storage devices.

20. A data storage system comprising:

a storage pool (SP) comprising a plurality of data storage devices, each data storage device comprising a non-volatile memory (NVM);

means for receiving, from each of the plurality of data storage devices in the SP, queue information of each respective command queue of the plurality of data storage devices;

means for receiving, from a host, a command to be performed using the SP;

means for selecting, based on the queue information, a target data storage device among the plurality of data storage devices to minimize head-of-line blocking for the received command and to maximize parallel usage of command queues in at least one first data storage device and at least one second data storage device among the plurality of data storage devices, the at least one first data storage device each comprising a single command queue and the at least one second data storage device each comprising a plurality of command queues, wherein the means for selecting the target data storage device is configured to select the target data storage device that includes more command queues than other data storage devices among the plurality of data storage devices; and means for sending the received command to the target data storage device.

* * * * *